United States Patent
Ida

(10) Patent No.: US 9,118,875 B2
(45) Date of Patent: Aug. 25, 2015

(54) SYSTEMS FOR DISPLAYING IMAGES ON PORTABLE DISPLAY DEVICES AND HEAD-MOUNTABLE DISPLAYS, METHODS FOR CONTROLLING SUCH SYSTEMS, AND COMPUTER-READABLE STORAGE MEDIA STORING INSTRUCTIONS FOR CONTROLLING SUCH SYSTEMS

(75) Inventor: Takayasu Ida, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 153 days.

(21) Appl. No.: 13/612,419

(22) Filed: Sep. 12, 2012

(65) Prior Publication Data

US 2013/0002701 A1 Jan. 3, 2013

Related U.S. Application Data

(63) Continuation-in-part of application No. PCT/JP2011/068665, filed on Aug. 18, 2011.

(30) Foreign Application Priority Data

Aug. 18, 2010 (JP) .................................. 2010-183519

(51) Int. Cl.
- *G09G 5/00* (2006.01)
- *H04N 5/64* (2006.01)
- *H04N 21/41* (2011.01)
- *H04N 21/414* (2011.01)
- *H04N 21/4402* (2011.01)

(52) U.S. Cl.
CPC .............. *H04N 5/64* (2013.01); *H04N 21/4122* (2013.01); *H04N 21/41407* (2013.01); *H04N 21/440245* (2013.01)

(58) Field of Classification Search
CPC ............................. G02B 27/01; G02B 27/017
USPC ........................................................ 345/7–9
See application file for complete search history.

(56) References Cited

U.S. PATENT DOCUMENTS 5,739,797 A * 4/1998 Karasawa et al. ............... 345/8
6,167,413 A * 12/2000 Daley, III ...................... 708/139

(Continued)

FOREIGN PATENT DOCUMENTS

| JP | 2000-181421 A | 6/2000 |
| JP | 2003-279881 A | 10/2003 |

(Continued)

OTHER PUBLICATIONS

Japan Patent Office, Notice of Reasons for Rejection for Japanese Patent Application No. 2010-183519 (counterpart to above-captioned patent application), mailed Oct. 22, 2013.

*Primary Examiner* — Viet Pham
(74) *Attorney, Agent, or Firm* — Baker Botts L.L.P.

(57) ABSTRACT

A system includes a head-mountable display and a portable information processor. The portable information processor includes a determination device that determines whether communication between a head-mountable display and the portable information processor is enabled. The portable information processor includes an identification device that identifies at least a portion of image data that is displayed by the portable information processor. The portable information processor includes a transmitter that transmits the identified at least a portion of the image data to the head-mountable display when the determination device determines that communication between the head-mountable display and the portable information processor is enabled. The head-mountable display includes a receiver that receives the identified at least a portion of the image data from the portable information processor. The head-mountable display includes a display that displays the identified at least a portion of the image data.

20 Claims, 7 Drawing Sheets

(56) References Cited

U.S. PATENT DOCUMENTS

2004/0027312 A1\* 2/2004 Owada et al. .................... 345/8
2005/0057439 A1\* 3/2005 Hata ................................ 345/8
2008/0048932 A1\* 2/2008 Yanagisawa ...................... 345/9

FOREIGN PATENT DOCUMENTS

| JP | 2008-059510 A | 3/2008 |
| JP | 2008-059511 A | 3/2008 |

\* cited by examiner

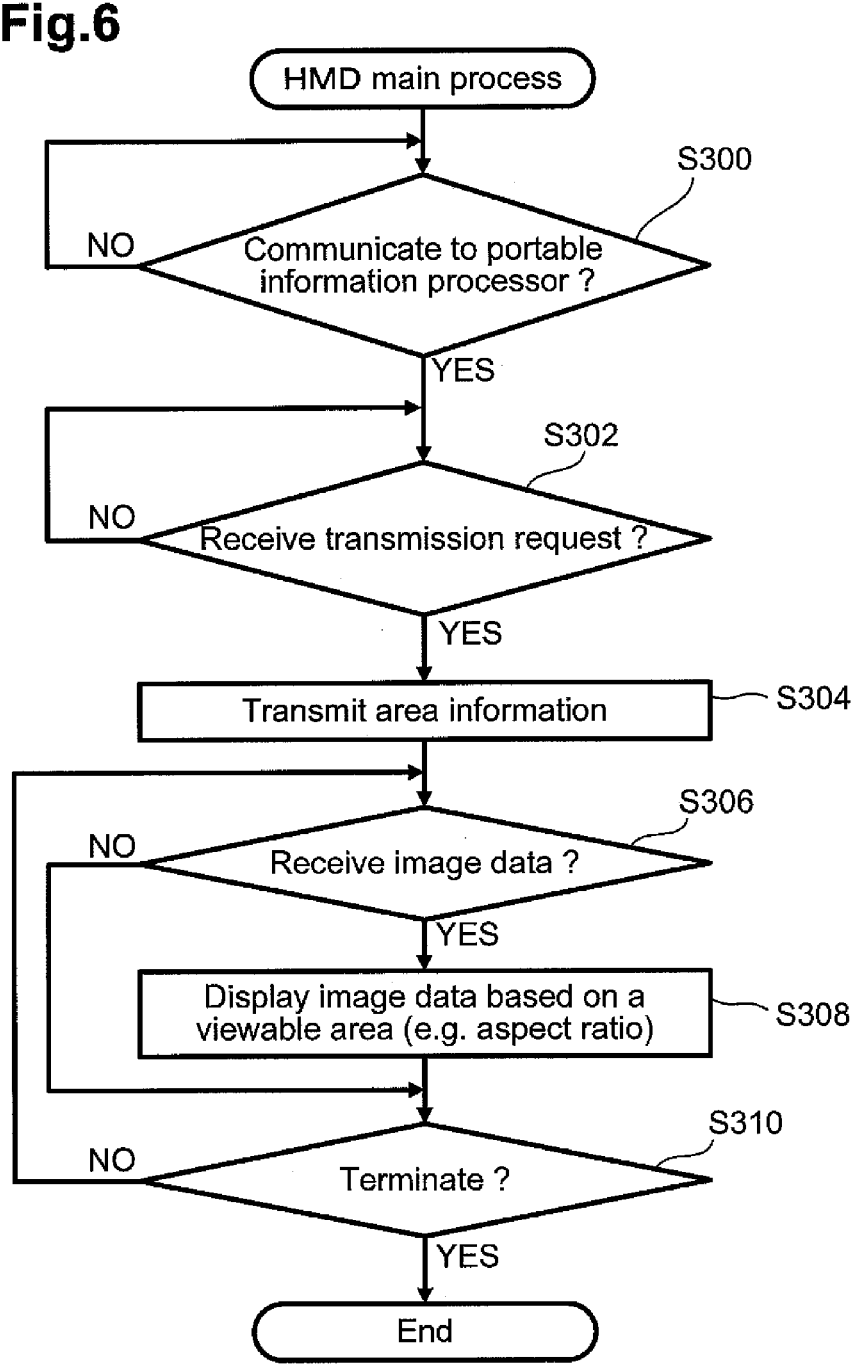

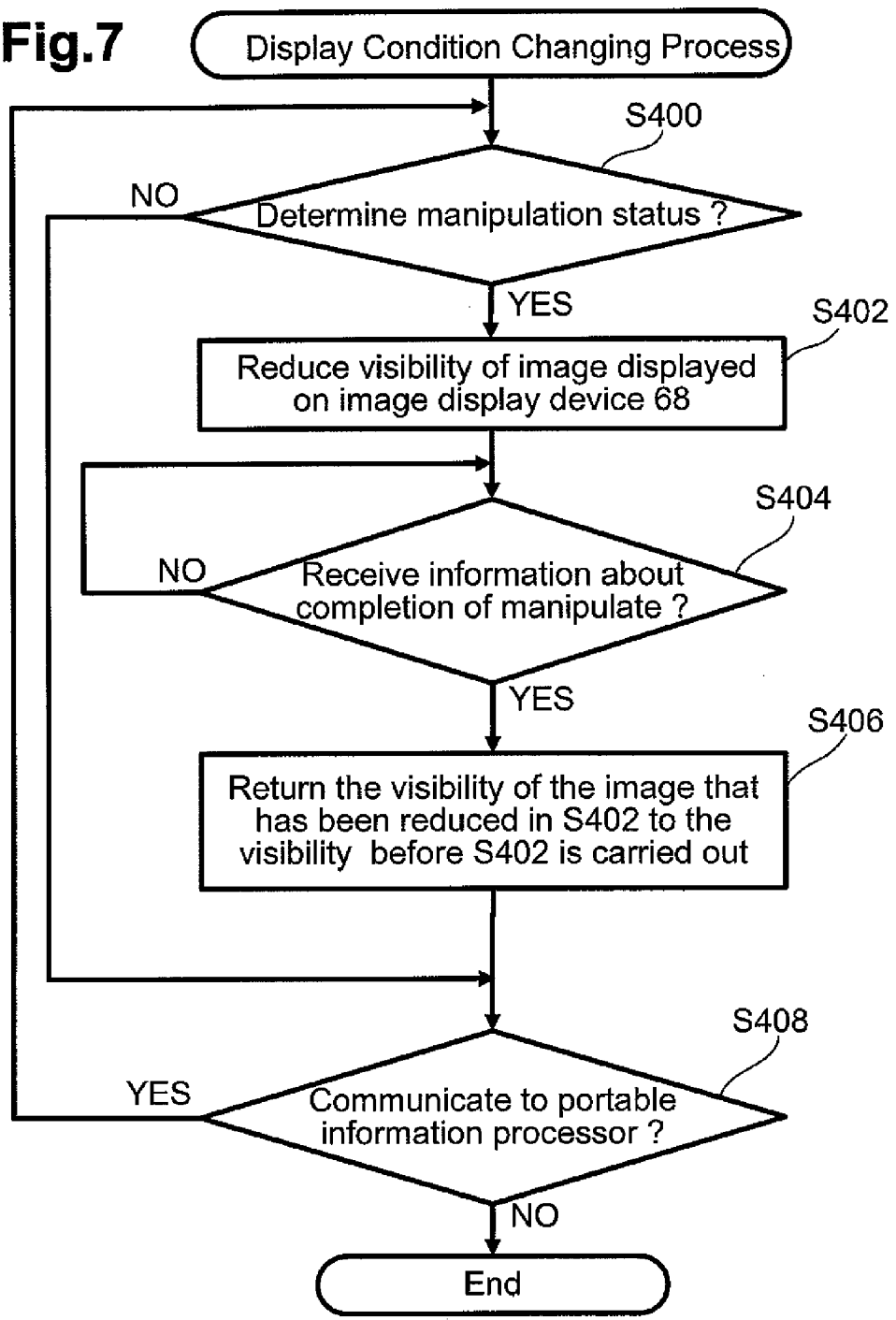

SYSTEMS FOR DISPLAYING IMAGES ON PORTABLE DISPLAY DEVICES AND HEAD-MOUNTABLE DISPLAYS, METHODS FOR CONTROLLING SUCH SYSTEMS, AND COMPUTER-READABLE STORAGE MEDIA STORING INSTRUCTIONS FOR CONTROLLING SUCH SYSTEMS

CROSS-REFERENCE TO RELATED APPLICATION

This application is a continuation-in-part of International Patent Application No. PCT/JP2011/068665, filed on Aug. 18, 2011, which claims the benefit of Japanese Patent Application No. 2010-183519, filed on Aug. 18, 2010, the disclosures of which are incorporated herein by reference.

BACKGROUND OF THE INVENTION

1. Field of the Invention

The present disclosure relates generally to image display systems, and more specifically to systems for displaying images on portable display devices and head-mountable displays, methods for controlling such systems, and computer-readable storage media storing instructions for controlling such systems.

2. Description of Related Art

Various portable devices and systems have been proposed, such as a portable information device. The portable information device includes a basic device, a holder, and a head-mountable display. The basic device of the portable information device is a personal digital assistant ("PDA") or smartphone that comprises a liquid crystal display ("LCD"). The holder is attached to the basic device, such that the basic device functions as a wearable personal computer ("PC"). The wearable PC is a PC that is configured to be used by a user wearing the PC. The head-mountable display includes a display screen and is connected to the holder. Content displayed on a partial area of the display screen of the head-mountable display is also displayed on the liquid crystal panel of the basic device.

SUMMARY OF THE INVENTION

According to embodiments, a system disclosed herein may comprise a portable information processor and a head-mountable display ("HMD"). The portable information processor may comprise a first processor and a first memory. The first memory may be configured to store first computer-readable instructions therein. The first computer-readable instructions may instruct the first processor to execute certain processes. The first computer-readable instructions may instruct the first processor to execute a process of determining whether communication between a head-mountable display and the portable information processor is enabled. The first computer-readable instructions may instruct the first processor to execute a process of identifying at least a portion of image data that is displayed by the portable information processor. The first computer-readable instructions may instruct the first processor to execute a process of transmitting the identified at least a portion of the image data to the head-mountable display when the first processor determines that communication between the head-mountable display and the portable information processor is enabled. The head-mountable display may comprise a second processor and a second memory. The second memory may be configured to store second computer-readable instructions therein. The second computer-readable instructions may instruct the second processor to execute certain processes. The second computer-readable instructions may instruct the second processor to execute a process of receiving the identified at least a portion of the image data from the portable information processor. The second computer-readable instructions may instruct the second processor to execute a process of displaying on the head-mountable display the identified at least a portion of the image data.

According to other embodiments, a method for controlling one or more of a portable information processor and a HMD disclosed herein may comprise certain processes for controlling the portable information processor and the HMD. The method may comprise a process of determining by a portable information processor whether communication between a head-mountable display and the portable information processor is enabled. The method may comprise a process of identifying by the portable information processor at least a portion of image data that is displayed by the portable information processor. The method may comprise a process of transmitting by the portable information processor the identified at least a portion of the image data to the head-mountable display when it is determined that communication between the head-mountable display and the portable information processor is enabled. The method may comprise a process of receiving by the head-mountable display the identified at least a portion of the image data from the portable information processor. The method may comprise a process of displaying by the head-mountable display the identified at least a portion of the image data.

According to yet other embodiments, a non-transitory, computer-readable storage medium disclosed herein may store computer-readable instructions therein. The computer-readable instructions may instruct a portable information processor to execute certain processes. The computer-readable instructions may instruct a portable information processor to execute a process of determining whether communication between a head-mountable display and the portable information processor is enabled. The computer-readable instructions may instruct a portable information processor to execute a process of identifying at least a portion of image data that is displayed by the portable information processor. The computer-readable instructions may instruct a portable information processor to execute a process of transmitting the identified at least a portion of the image data to the head-mountable display when the portable information processor determines that communication between the head-mountable display and the portable information processor is enabled.

According to still other embodiments, a system disclosed herein may comprise a head-mountable display and a portable information processor. The portable information processor may comprise a determination device configured to determine whether communication between a head-mountable display and the portable information processor is enabled. The portable information processor may comprise an identification device configured to identify at least a portion of image data that is displayed by the portable information processor. The portable information processor may comprise a transmitter configured to transmit the identified at least a portion of the image data to the head-mountable display when the determination device determines that communication between the head-mountable display and the portable information processor is enabled. The head-mountable display may comprise a receiver configured to receive the identified at least a portion of the image data from the portable information processor. The head-mountable display may comprise a display configured to display the identified at least a portion of the image data.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present disclosure, needs satisfied thereby, and the objects features, and advantages thereof, reference now is made to the following descriptions taken in connection with the accompanying drawings.

FIG. 6 depicts a main process executed by the HMD.

FIG. 7 depicts a display status changing process executed by the HMD.

DETAILED DESCRIPTION OF EMBODIMENTS OF THE INVENTION

In portable information devices, an entire image may be displayed on a head-mountable display ("HMD"). A portion of an image area displayed on the HMD also may be displayed on a portable information processor that may be used as the basic device. In an image display system, under some conditions, communication between the portable information processor and the HMD may be interrupted. For example, when the portable information processor and the HMD are connected with a cable, the cable may detach from one or more of the portable information processor and the HMD. Alternatively, when the portable information processor and the HMD are connected by means of short-range wireless communication, the wireless communication may be interrupted temporarily, for example, by increased distance between the portable information processor and the HMD or by an obstacle existing between the portable information processor and the head-mountable display. In such it may not be possible to associate the devices with each other and display an associated image.

The present disclosure provides an image display system that may efficiently display a suitable image.

Image Display System

Figure 1:
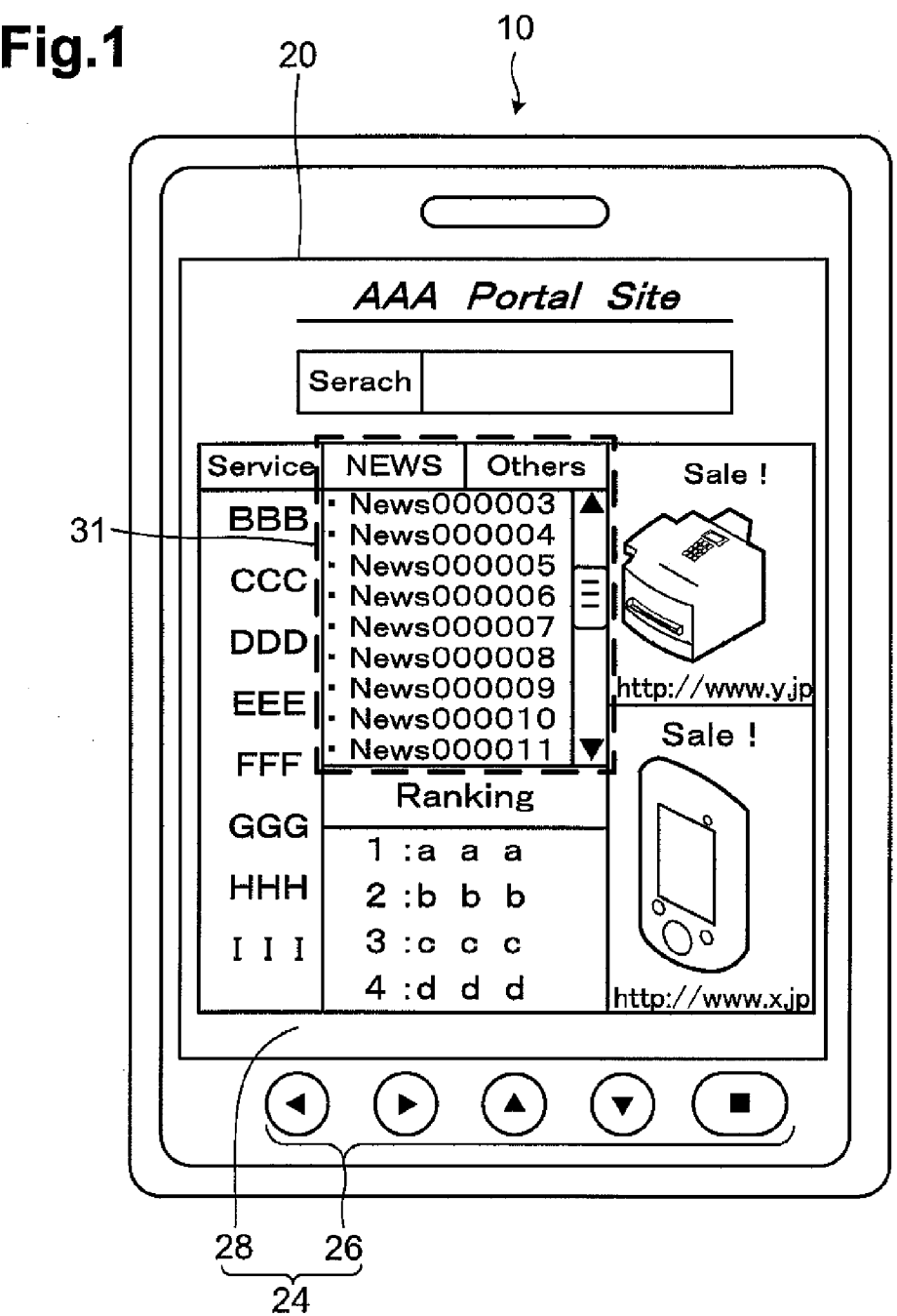
FIG. 1 depicts an exterior portion of a portable information processor.
Figure 2:
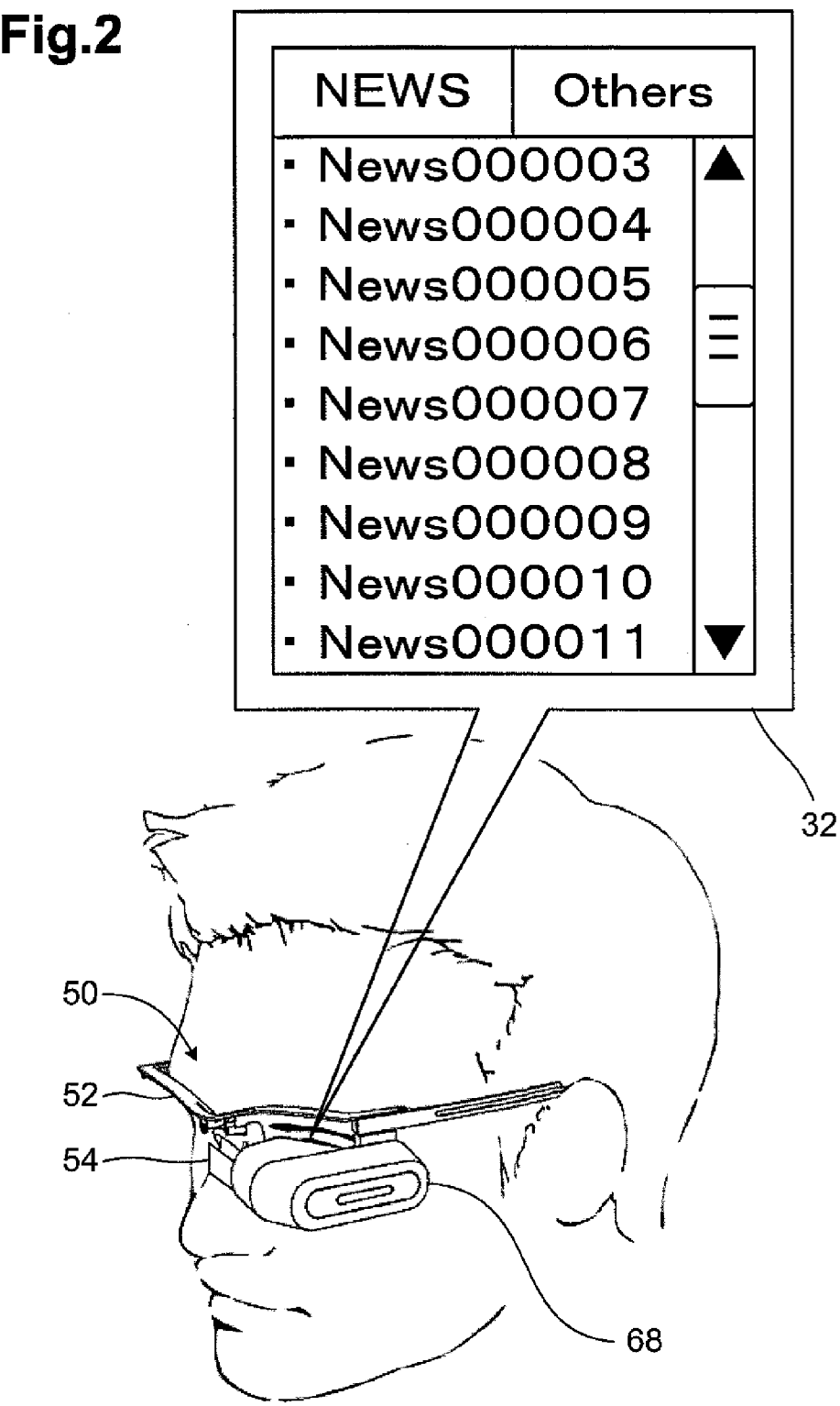
FIG. 2 depicts an exterior portion of a head-mountable display ("HMD") with an exploded view of a partial image displayed on the HMD.
Figure 3:
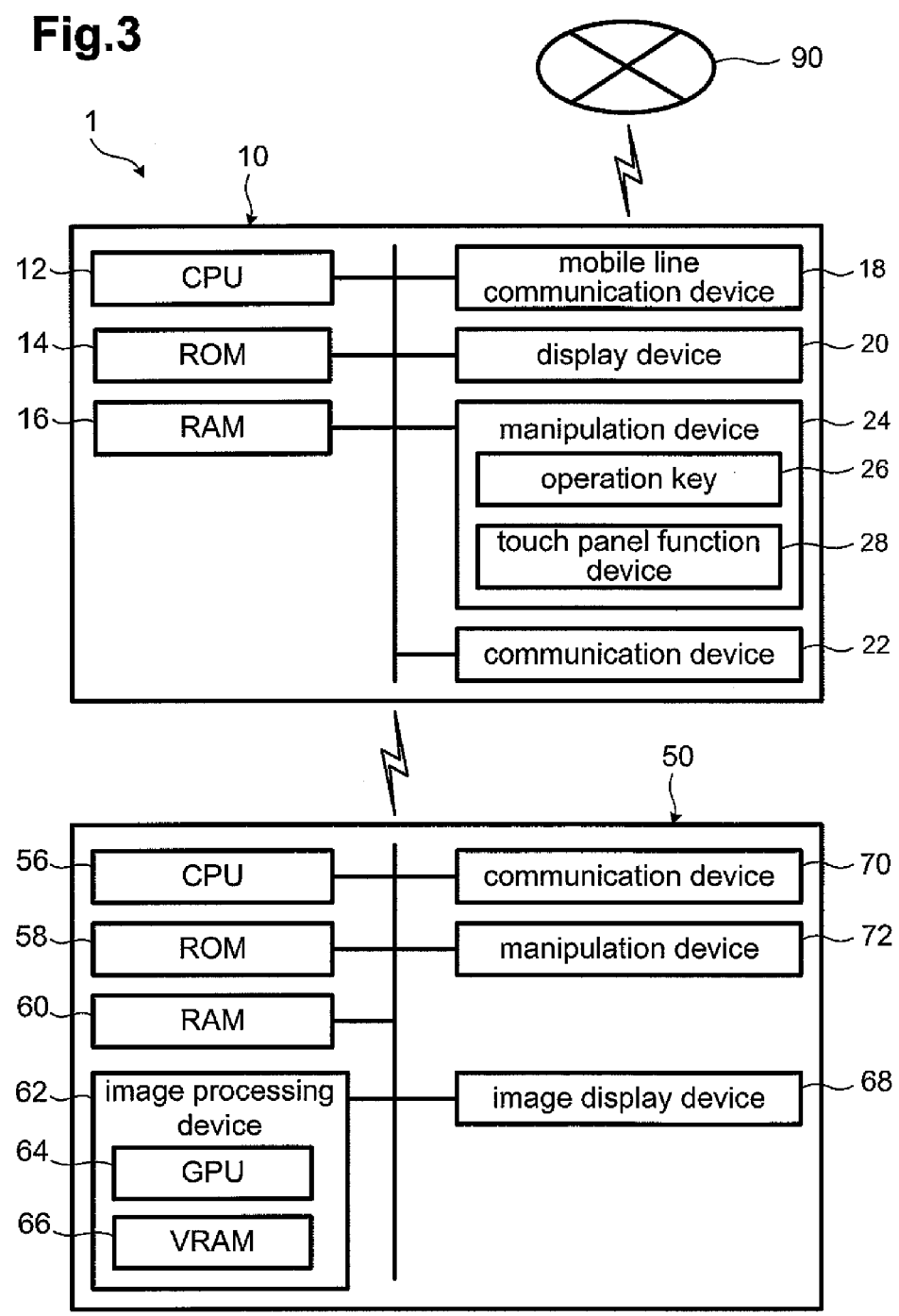
FIG. 3 is a block diagram of electrical configurations of the portable information processor and the HMD.

Exemplary embodiments of the present disclosure now are described with reference to the drawings. An image display system 1 may comprise a portable information processor 10, as depicted in FIG. 1, and a HMD 50, as depicted in FIG. 2. The image display system 1 may enable a user to view images, as depicted in FIGS. 1 and 2, at the same time by using a display device 20 of the portable information processor 10 and an image display device 68 of the HMD 50. In the image display system 1, the portable information processor 10 and the HMD 50 may communicate with each other, as depicted in FIG. 3. The portable information processor 10 and the HMD 50 may be linked by, for example, a wireless connection, as depicted in FIG. 3. Communication between the portable information processor 10 and the HMD 50 is enabled via wireless communication. The wireless communication system may be, for example, Bluetooth® or a wireless local area network ("LAN"). Alternatively, the portable information processor 10 and the HMD 50 may be linked by wired connection using a communication cable. The portable information processor 10 and the HMD 50 may communicate with each other via the communication cable. The wired connection system may be, for example, local connection, such as USB connection. In certain configurations, a wired LAN may be used. Communication between the portable information processor 10 and the HMD 50 may be implemented by various wired and wireless communication systems.

The portable information processor 10 may be a device that may display an image in a manner such as that depicted in FIG. 1. The portable information processor 10 may be, for example, a mobile phone, such as a smartphone, a tablet PC, or an electronic book. The portable information processor 10 may communicate via, for example, a public network 90, as depicted in FIG. 3. The public network 90 may be, for example, a cellular-based communication network. Regarding the image, the portable information processor 10 may access a predetermined site on the Internet, via the public network 90, and may acquire image data that may represent, for example, an image of a portal site, as depicted in FIG. 1. Further, the portable information processor 10 may access a storage device or a non-transitory storage medium other than a site on the Internet and may acquire image data that represents the image.

The HMD 50 may permit the user to view the external world (e.g., the actual environment surrounding the user) alone or superimposed with virtual objects and information. Consequently, the HMD 50 may be referred to as a "see-through" HMD (e.g., a "pass-through" HMD). A "see-through display," such as a "see-through" HMD, may permit a user to see virtual objects and information displayed by the "see-through" display superimposed with the external world (e.g., the actual environment surrounding the user) visible through the "see-through" display. In the state depicted in FIG. 2, the user may view an image of the external world superimposed with an image displayed on the HMD 50. In the HMD 50, a partial image 32 may be displayed. The partial image 32 may be a partial area 31 of an image displayed on the display device 20 of the portable information processor 10 that comprises predetermined information, as depicted in FIG. 1. The partial image 32 may comprise at least a portion of the information depicted in FIG. 2. The user of the HMD 50 may view the partial image 32, as depicted in FIG. 2. The partial image 32 may be an enlarged image that comprises an enlarged portion of an image comprising predetermined information. Hereinafter, an image that comprises the partial image 32 as a partial area, as depicted in FIG. 1, may be referred to as an "entire image," and image data representing the entire image may be referred to as "entire image data." The entire image also may be displayed on the HMD 50 in addition to the partial image as described below. The HMD 50 may have a frame structure 52 that may be similar to the structure of typical eyeglasses. The HMD 50 may be supported on the user's face by the frame structure 52. An image display device 68 may be attached to the frame structure 52 at a predetermined position. The image display device 68 may display an image viewable by the user's eye, e.g., the user's left eye in the example of FIG. 2, such that the user may view the image. When attached to the frame structure 52, the image display device 68 may be disposed at substantially the same height position as the left eye of the user wearing the HMD 50.

Figure 4:
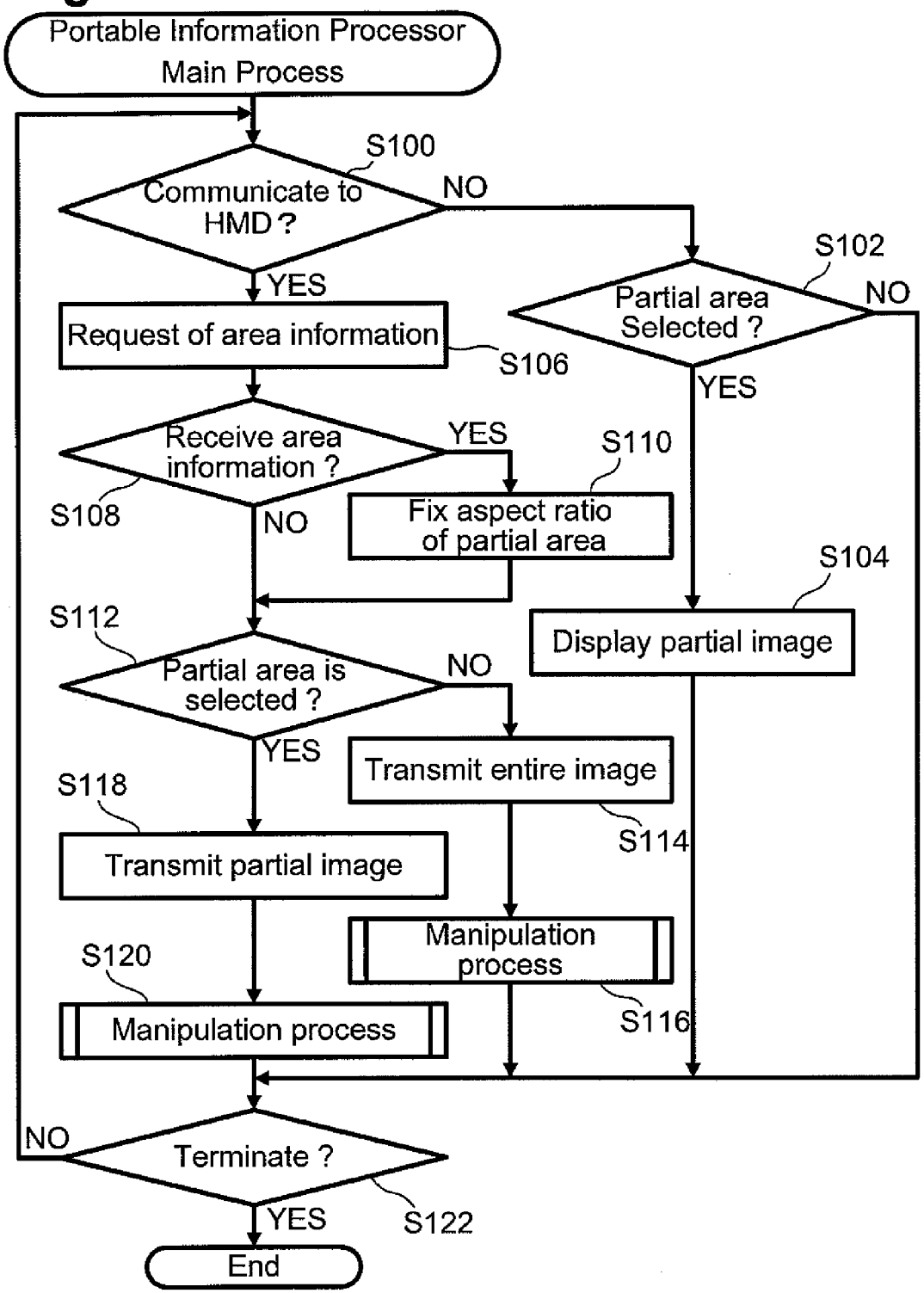
FIG. 4 depicts a main process executed by the portable information processor.
Figure 5:
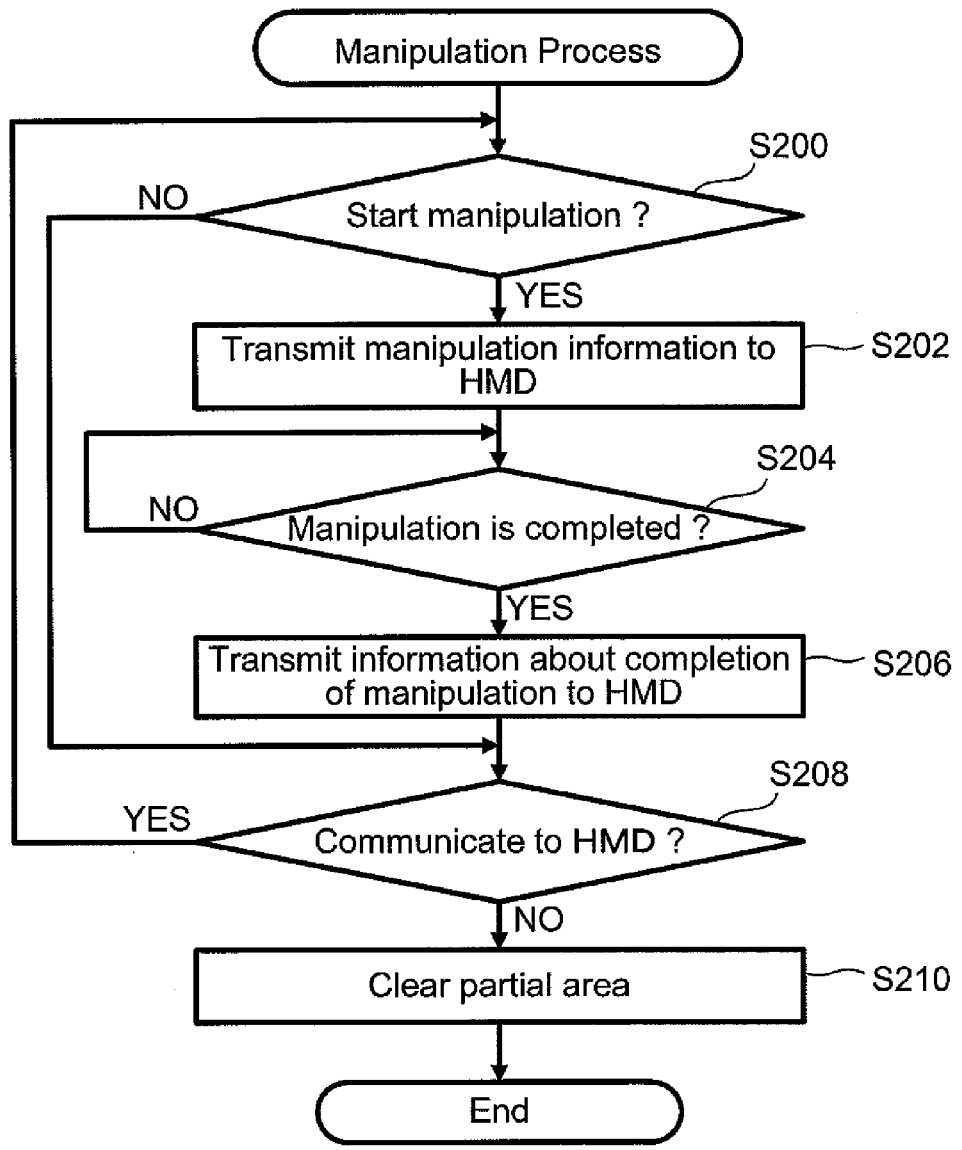
FIG. 5 depicts a manipulation process executed by the portable information processor.

The portable information processor 10 may be provided with a central processing unit ("CPU") 12, a read-only memory ("ROM") 14, a random-access memory ("RAM") 16, a mobile line communication device 18, a display device 20, a communication device 22, and a manipulation device 24, as depicted in FIG. 3. The CPU 12 may control various processes carried out by the portable information processor 10. The ROM 14 may store computer programs (e.g., application programs) for various processes carried out by the portable information processor 10. For example, the ROM 14 may store a computer program for the process depicted in FIGS. 4 and 5, which is described below. The RAM 16 may be used as a workspace in which various processes are carried out by the portable information processor 10. That is, the CPU 12 may execute, on the RAM 16, a computer program stored in the ROM 14. For example, when the CPU 12 initiates a main process, as depicted in FIG. 4, or a manipulation process, as depicted in FIG. 5, the computer program for each process may be read from the ROM 14 and executed on the RAM 16. In this manner, various functions may be executed by the CPU 12 implementing the computer program. In lieu of ROM 14, the computer program may be stored in other types of non-transitory computer-readable media.

The mobile line communication device 18 may communicate with the public network 90. In the portable information processor 10, an entirety of the image data that represents the entire image displayed on the display device 20 may be acquired through communication via the mobile line communication device 18. The display device 20 may display the entire image or a partial image in a manner corresponding to the manner depicted in FIG. 1. The communication device 22 may, for example, communicate wirelessly with the HMD 50. When the portable information processor 10 and the HMD 50 are linked by a wired connection, the communication device 22 (e.g., a transmitter and a receiver) may comprise a communication interface ("I/F") that may support the wired connection. When a storage device that stores image data representing the image to be displayed is comprised in a system comprising the image display system 1, the communication device 22 may access the storage device and may acquire the stored image data.

The manipulation device 24 may comprise a predetermined operation key 26 and a touch panel function device 28. The user may manipulate one or more of the operation key 26 and the touch panel function device 28 and may input predetermined instructions in the portable information processor 10. In addition to the components described above, the portable information processor 10 may comprise an interface for, for example, the attachment of a predetermined storage medium. In this configuration, the image data representing the entirety of the image of a subject to be displayed may be acquired from the recording medium. The storage medium may be, for example, one or more of a predetermined memory card and a universal serial bus ("USB") memory. In such configurations, the portable information processor 10 may comprise an appropriate one or more of a memory card slot and a USB connection interface.

As depicted in FIG. 3, the HMD 50 may be provided with a CPU 56, a ROM 58, a RAM 60, an image processing device 62, an image display device 68, a communication device 70, and a manipulation device 72. The CPU 56 may control various processes carried out by the HMD 50. The ROM 58 may store computer programs (e.g., application programs) for various processes carried out by the HMD 50. For example, the ROM 58 may store a computer program for the process depicted in FIGS. 6 and 7 (described below). The RAM 60 may be a workspace which HMD 50 utilizes to execute various processes. That is, the CPU 56 may execute, on the RAM 60, the computer program stored in the ROM 58. For example, when the CPU 56 initiates a main process, depicted in FIG. 6, or a display status changing process, as depicted in FIG. 7, CPU 56 may read the computer program for each process from the ROM 58 and execute the computer program for each process utilizing the RAM 60. In this manner, various functions may be executed by the CPU 56 implementing the computer program. As noted above, the computer program may be stored in other types of non-transitory computer-readable media. Alternatively, the process or a portion thereof may be implemented through hardware through the use of an ASIC.

The image processing device 62 may comprise a graphics processing device ("GPU") 64 and Video RAM ("VRAM") 66. The image processing device 62 may create an image for display on the image display device 68 in accordance with instructions from the CPU 56. For example, the image may be an entire image or a partial image. In particular, the GPU 64 may reproduce image data representing the entire image or the partial image for display on the image display device 68 and may generate the image. The generated image may be stored in the VRAM 66.

The image display device 68 may comprise a retinal scanning display. The retinal scanning display may scan a retina with image-wise light in the 2D direction (e.g., in a first direction and a second direction perpendicular to the first direction) in accordance with an image signal. For example, the image signal may represent an image that is, for example, the entire image or the partial image generated by the image processing device 62 and stored in the VRAM 66. The image display device 68 may, for example, guide the scanning image-wise light to one or more of a user's eyes and may generate an image on one or more corresponding retinas. The image-wise light emitted from the image display device 68 may be reflected by a half mirror 54 disposed before the one or more of the user's eyes, and the image-wise light may be guided to the one or more of the user's eyes accordingly. The half mirror 54 may be fixed to the image display device 68. The user who is wearing the HMD 50 may view the entire image or the partial image in this manner. The image display device 68 may comprise one or more of a LCD, an organic electroluminescence display ("OELD"), and other devices in addition to the retinal scanning display. A viewable area (e.g., resolution) of the image display device 68 may be greater than, for example, a viewable area of the display device 20 comprised in the portable information processor 10. Alternatively, the viewable area of the image display device 68 may be less than the viewable area of the display device 20.

The communication device 70 may utilize one or more of a wireless communication system and a wired communication system to communicate with, for example, the portable information processor 10. The configuration of the communication device 70 may be the same as that of the communication device 22 comprised in the portable information processor 10. Accordingly, a description thereof is omitted herein. The manipulation device 72 may comprise, for example, a predetermined key. The user may manipulate the manipulation device 72 and input predetermined instructions in the HMD 50 utilizing the manipulation device 72. In the HMD 50, each component described above may be housed in a housing that comprises the image display device 68, as depicted in FIG. 2. That is, the HMD 50 depicted in FIGS. 2 and 3 may be formed as a single device. Alternatively, the HMD 50 may comprise a control box and a HMD main body that are separate from each other but connected through a signal cable (not depicted). In such a configuration, the CPU 56, the ROM 58, the RAM 60, the image processing device 62, the communication device 70, and the manipulation device 72 depicted in FIG. 3 may be housed in the control box. The image display device 68 may be attached to the frame structure 52 in the manner depicted in FIG. 2 and may comprise the HMD main body together with the frame structure 52. The control box and the HMD main body each may be provided with an interface for transmitting and receiving signals therebetween. The signals transmitted and received between these devices may be one or more of image signals and command signals.

Regarding the operations of the image display system 1, each of a process executed by the portable information processor 10 and a process executed by the HMD 50 is described below.

Process Executed by Portable Information Processor

The process executed by the portable information processor 10 may comprise a main process, as depicted in FIG. 4, and a manipulation process, as depicted in FIG. 5, each of which is described below.

Main Process

The main process in the portable information processor 10 may be initiated when the manipulation device 24 is manipulated and an instruction to initiate the main process is input therethrough. The user may manipulate the manipulation device 24 (e.g., one or more of the operation key 26 and the touch panel function device 28) and input the instructions to for the CPU 12 to initiate the main process. Before the main process is initiated, a process for displaying a predetermined image may be executed in the portable information processor 10. When this process is carried out, the entire image, as depicted in FIG. 1, for example, may be displayed on the display device 20 of the portable information processor 10. The CPU 12, which initiated the main process, may determine a communication status between the portable information processor 10 and the HMD 50 (e.g., may determine whether communication between the portable information processor 10 and the HMD 50 is enabled) (S100). When the portable information processor 10 and the HMD 50 are configured to connect through a wireless connection, the CPU 12 may determine at S100 whether wireless communication between the portable information processor 10 and the HMD 50 is enabled. When the portable information processor 10 and the HMD 50 are configured to connect through a wired connection, the CPU 12 may determine at S100 whether a communication cable is connected to the communication device 22, and when the communication cable is connected to the communication device 22, the CPU 12 may further determine whether wired communication between the portable information processor 10 and the HMD 50 is enabled.

When it is determined at S100 that a desired one of wireless communication and wired communication is not enabled (S100: NO), the CPU 12 may proceed to S102. At S102, the CPU 12 may determine whether a partial area has been selected from the entire image displayed on the display device 20. Such a selected partial area may be, for example, selected as an enlargement range that may be displayed in an enlarged manner. A partial area 31 may be designated when the user manipulates the touch panel function device 28 to select a portion of the entire image. The CPU 12 may select the portion of the entire image designated as a partial area via the touch panel function device 28 as the enlargement range. A dotted line in FIG. 1 represents the designated partial area 31. The portion of the entire image enclosed by the dotted line may be selected as the partial area 31. The portion of the entire image designated by the user may be, for example, surrounded by a predetermined frame, as depicted in FIG. 1, such that the user may recognize the designated portion when the user selects the partial area via the touch panel function device 28. When it is determined that the partial area has not been selected (S102: NO), the CPU 12 may proceed to S122 and determine whether to terminate the main process. When the partial area has been selected (S102: YES), the CPU 12 may control the display device 20 to display thereon a partial image corresponding to the selected partial area (S104). The partial image 32 may, for example, be an image as depicted in FIG. 2. Specifically, the partial image 32 may be an enlarged version (as perceived by the user) of the partial area 31 that is surrounded by the dotted line in FIG. 1. Thereafter, the CPU 12 may proceed to S122 and determine whether to terminate the main process.

When it is determined at S100 that the desired one of wireless communication and wired communication is enabled (S100: YES), the CPU 12 may proceed to S106. At S106, the CPU 12 may control the communication device 22 to transmit a request to the HMD 50 for area information about the viewable area. The requested area information about the viewable area may comprise area information indicating a range (e.g., resolution) that may be displayed on the image display device 68. The area information may represent the range (e.g., resolution) that may be displayed on the image display device 68. Based on the area information about the viewable area received from the HMD 50, an aspect ratio of the range that may be displayed on the image display device 68 may be determined. The transmission request may be received by the HMD 50 in a state in which the determination at S300 of FIG. 6 is affirmed (S300: YES, as described below). After the transmission request is transmitted, the CPU 12 may determine whether the area information transmitted from the HMD 50 in response to the request has been received (S108). The area information may be transmitted from the HMD 50 at S304 of FIG. 6 (described below). When it is determined that the area information has not been received (S108: NO), the CPU 12 may proceed to S112. When it is determined that the area information has been received (S108: YES), the CPU 12 may fix an aspect ratio of the partial area selected as the enlargement range to the aspect ratio determined from the received area information (S110). Consequently, the partial area may be designated via the touch panel function device 28 at a fixed aspect ratio, and the aspect ratio of the partial area selected by the CPU 12 may be fixed. After S110 is completed, the CPU 12 may proceed to S112.

At S112, the CPU 12 may determine whether the partial area of the entire image displayed on the display device 20 has been selected. The process of S112 may be the same as that of S102 described above, and the partial area may be selected in accordance with the designation via the touch panel function device 28 in the same manner described above. When it is determined that the partial area has not been selected (S112: NO), the CPU 12 may control the communication device 22 to transmit entire image data, which may represent the entire image displayed on the display device 20, to the HMD 50 (S114). The entire image data may be received by the HMD 50, where the determination at S306 of FIG. 6 may be executed in accordance with whether the entire image data has been received (described below). Then the CPU 12 may carry out the manipulation process (S116). The manipulation process is described below. After S116 is completed, the CPU 12 may proceed to S122 and determine whether to terminate the main process.

When it is determined that the partial area has been selected at S112 (S112: YES), the CPU 12 may control the communication device 22 to transmit the partial image data, which represents the partial image corresponding to the selected partial area, to the HMD 50 (S118). When S110 has been carried out, the partial image data transmitted at S118 may represent the partial image at the aspect ratio fixed at S110.

The partial image data may be generated from the entire image data in accordance with the selected partial area. The partial image data may be received by the HMD 50. In the HMD 50, a determination at S306 of FIG. 6 may be executed according to whether the partial image data has been received by the HMD 50 (described below). Thereafter, the CPU 12 may carry out the manipulation process (S120). The manipulation process is described below. After S120 is completed, the CPU 12 may proceed to S122 and determine whether to terminate the main process.

At S122, the CPU 12 may determine whether an instruction to terminate the main process has been input. The instruction to terminate the main process may be input by the user via the manipulation device 24 (e.g., one or more of the operation key 26 and the touch panel function device 28). When it is determined that the instruction to terminate the main process has not been input (S122: NO), the CPU 12 may return to the process of S100 and repeat each process described above. When the instruction to terminate the main process has been input (S122: YES), the CPU 12 may terminate the main process.

Manipulation Process

The manipulation process depicted in FIG. 5 may be executed at S116 and S120 of FIG. 4. The CPU 12, which initiated the manipulation process, may determine whether manipulation of the manipulation device 24 has been initiated (e.g., a manipulation status of the manipulation device 24) (S200). For example, when the touch panel function device 28 is manipulated to scroll between entries ("News000003," "News000004," etc.) comprised in a frame of a "NEWS" tab, the CPU 12 may determine that the manipulation device 24 has been manipulated. Each entry may be comprised in the entire image displayed on the display device 20, as depicted in FIG. 1, and in the partial image 32 displayed on the image display device 68, as depicted in FIG. 2.

When it is determined that the manipulation has not been initiated (S200: NO), the CPU 12 may proceed to S208 (described below). When it is determined that the manipulation has been initiated (S200: YES), the CPU 12 may control communication device 22 to transmit manipulation information, which may indicate the manipulation status of the manipulation device 24, to the HMD 50 (S202). The manipulation information may indicate the manipulation status of the manipulation device 24. The manipulation information may indicate, for example, that input of a predetermined instruction in the manipulation device 24 has been initiated and that the input is being continued. The manipulation information may be received by the HMD 50. In the HMD 50, a determination at S400 of FIG. 7 may be carried out in accordance with whether the manipulation status has been received by the HMD 50 (described below).

Thereafter, the CPU 12 may determine whether the manipulation information indicates that the manipulation of the manipulation device 24 has been completed (S204). The subject of determination may be the manipulation determined to be initiated at S200. For example, when scrolling between entries comprised in the frame of the "NEWS" tab is stopped via the touch panel function device 28, the CPU 12 may determine that the manipulation corresponding to the scrolling has been terminated. When the manipulation is continued, the CPU 12 may determine that the manipulation has not been completed. When it is determined that the manipulation has not been completed (S204: NO), the CPU 12 may periodically repeat S204 until CPU 12 determines that the manipulation is completed. When it is determined that the manipulation has been completed (S204: YES), the CPU 12 may control the communication device 22 to transmit information about completion of the manipulation to the HMD 50 (S206). The information about completion of the manipulation may indicate the manipulation status of the manipulation device 24. More specifically, the information about completion of the manipulation may indicate, for example, that input of a predetermined instruction via the manipulation device 24 has not been completed and that no further input has been made. The information about completion of the manipulation may be received by the HMD 50, by which the determination at S404 of FIG. 7 may be carried out in accordance with whether the information about completion of the manipulation has been received (described below).

After S206 is completed or when it is determined that the manipulation has not been initiated (S200: NO), the CPU 12 may determine whether the portable information processor 10 and the HMD 50 may establish communication therebetween (S208). The process of S208 may be the same as that of S100 described above. Therefore, further description of S208 is omitted. When CPU 12 determines that the portable information processor 10 may establish communication with the HMD 50 (S208: YES), the CPU 12 may return the process to S200 and repeat the manipulation process described above. CPU 12 determines that the portable information processor 10 may not establish communication with the HMD 50 (S208: NO), the CPU 12 may clear the selected partial area (S210), which was selected when, for example, the determination at S102 or S112 of FIG. 4 was made (described above). After S210 is completed, the CPU 12 may terminate the manipulation process. Thereafter, the CPU 12 may proceed to S122 of FIG. 4.

Processes Carried Out by HMD

The process executed by the HMD 50 may comprise a main process, as depicted in FIG. 6, and a display condition changing process, as depicted in FIG. 7, each of which is described below.

Main Process

The main process in the HMD 50 may be initiated when, for example, the HMD 50 is powered on. Specifically, the main process may be initiated when the manipulation device 72 is manipulated to input an instruction to initiate the main process. The CPU 56, which initiated the main process, may determine the communication status between the portable information processor 10 and the HMD 50 (S300). Specifically, in step S300 the CPU 56 may, for example, determine whether communication between the portable information processor 10 and the HMD 50 is enabled. When the portable information processor 10 and the HMD 50 are configured to connect wirelessly, the CPU 56 may determine at S300 whether wireless communication between the portable information processor 10 and the HMD 50 is enabled. When the portable information processor 10 and the HMD 50 are configured to connect via a wired connection, the CPU 56 may determine at S300 whether a communication cable is connected to the communication device 70. When it is determined that the communication cable is connected, the CPU 56 may determine whether wired communication, via the communication cable, between the portable information processor 10 and the HMD 50 is enabled. When it is determined that the desired one of the wired communication and wireless communication is not enabled between the portable information processor 10 and the HMD 50 (S300: NO), the CPU 56 may repeat S300 periodically until the communication between the portable information processor 10 and the HMD 50 is enabled.

When it is determined that the desired one of the wired communication and wireless communication is enabled between the portable information processor 10 and the HMD 50 (S300: YES), the CPU 56 may determine whether a transmission request has been received (S302). The transmission request may be transmitted from the portable information processor 10 at S106 of FIG. 4 (described above). The transmission request may be received by the communication device 70. When it is determined that the transmission request has not been received (S302: NO), the CPU 56 may repeat S302 periodically until the transmission request is received. When the transmission request has been received (S302: YES), the CPU 56 may carry out a process in response to the transmission request from the portable information processor 10. In particular, the CPU 56 may control the communication device 70 to transmit the area information about the viewable area of the image display device 68 to the portable information processor 10 (S304). The area information about the viewable area may be received by the portable information processor 10. Based on whether the area information has been received, the portable information processor 10 may execute the determination at S108 of FIG. 4.

Thereafter, the CPU 56 may determine whether the image data has been received from the portable information processor 10 (S306). The image data received by the HMD 50 at S306 may be one of the entire image data and the partial image data. The entire image data may be transmitted from the portable information processor 10 at S114 of FIG. 4 (described above). The partial image data may be transmitted from the portable information processor 10 at S118 of FIG. 4 (described above). The transmitted one of the entire image data and the partial image data may be received by the communication device 70. When it is determined that the image data has not been received (S306: NO), the CPU 56 may proceed to S310.

When it is determined that the image data has been received in the HMD 50 (S306: YES), the CPU 56 may control the image display device 68 to display the image represented by the received image data in accordance with the viewable area (e.g., at the aspect ratio) of the image display device 68 (S308). In particular, when the transmitted one of the entire image data and the partial image data is received, the image processing device 62 may process the received one of the entire image data and the partial image data in accordance with the instruction from the CPU 56 and generate, based on the received data, an appropriate one of the entire image displayed on the display device 20, as depicted in FIG. 1, and the partial image, as depicted in FIG. 2. The image processing device 62 may generate the appropriate one of the entire image and the partial image in the viewable area of the image display device 68 in a size according to, for example, a predetermined aspect ratio. In particular, GPU 64 may reproduce the appropriate one of the entire image data and the partial image data, and GPU 64 may generate the appropriate one of the entire image and the partial image according to the size of the viewable area of the image display device 68. The generated appropriate one of the entire image and the partial image may be stored in the VRAM 66.

Thereafter, the CPU 56 may control the image display device 68 to scan with image-wise light in the 2D direction based on an image signal that represents the generated appropriate one of the entire image and the partial image at S308. The scanning image-wise light may be reflected by the half mirror 54 and may be guided to one or more of the user's eyes, such that an image may be formed on one or more corresponding retinas. In this manner, the appropriate one of the entire image and the partial image may be displayed on the image display device 68, and the user may view the appropriate one of the entire image and the partial image on the image display device 68. When the partial image data transmitted at S118 of FIG. 4 is received after S110 of FIG. 4 is completed, the received partial image data may be data corresponding to the partial image in an aspect ratio corresponding to the aspect ratio of the viewable area of the image display device 68. In the portable information processor 10, the aspect ratio may be fixed at S110 of FIG. 4 in accordance with the area information transmitted at S304 because the partial area may be designated and selected at the fixed aspect ratio.

After S308 is completed, the CPU 56 may determine whether an instruction to terminate the main process has been input (S310). The instruction to terminate the main process may be input by manipulating the manipulation device 72. The CPU 56 also may determine that the instruction to terminate the main process has been input when the image display device 68, as depicted in FIG. 3, is powered off. When it is determined that the instruction to terminate the main process has not been input (S310: NO), the CPU 56 may return to the process of S306 and repeat each subsequent process described above. When the instruction to terminate the main process has been input (S310: YES), the CPU 56 may terminate the main process.

Display Condition Changing Process

The display condition changing process depicted in FIG. 7 may be executed in parallel with the main process in the HMD 50, as described above with reference to FIG. 6. The CPU 56 that initiated the display condition changing process may determine whether the manipulation status has been received (S400). The manipulation status may be transmitted from the portable information processor 10 at S202 of FIG. 5 (described above). The manipulation status may be received by the communication device 70. When it is determined that the manipulation status has not been received (S400: NO), the CPU 56 may proceed to S408. When it is determined that the manipulation status has been received (S400: YES), the CPU 56 may reduce visibility of the image displayed on the image display device 68 (e.g., the appropriate one of entire image and the partial image) (S402). Consequently, the user may view the external world (e.g., a real object in a real world) via the half mirror 54. Therefore, the user may view and manipulate the manipulation device 24 of the portable information processor 10 comfortably. Visibility may be reduced by various methods. For example, the size of the displayed one of the entire image and the partial image may be reduced. Alternatively, a color density of the displayed one of the entire image and the partial image may be increased, or a brightness of the displayed one of the entire image and the partial image may be decreased. The appropriate one of the entire image and the partial image may be displayed at S308 of FIG. 6 (described above).

Thereafter, the CPU 56 may determine whether the information about completion of the manipulation has been received (S404). The information about completion of the manipulation may be transmitted from the portable information processor 10 at S206 of FIG. 5 (described above). The information about completion of the manipulation may be received by the communication device 70. When it is determined that the information about completion of the manipulation has not been received (S404: NO), the CPU 56 may periodically repeat S404 until the information about completion of the manipulation is received. When it is determined that the information about completion of the manipulation has been received (S404: YES), the CPU 56 may return the visibility of the image, which was reduced at S402 (e.g., the reduced visibility of the appropriate one of the entire image and the partial image), to the visibility before S402 was executed (S406). This may help the user view comfortably the appropriate one the entire image and the partial image.

After S406 is completed, the CPU 56 may determine the communication status between the portable information processor 10 and the HMD 50 (S408). Specifically, the CPU 56 may, for example, determine whether communication between the portable information processor 10 and the HMD 50 is enabled. The process of S408 may be the same as that of S300 described above. Therefore, further description thereof is omitted. When it is determined that the communication is enabled (S408: YES), the CPU 56 may return the process to S400 and repeat each process of the display condition changing process described above. When it is determined that the communication is not enabled (S408: NO), the CPU 56 may terminate the display condition changing process.

In the image display system 1 executing the process described above, the user may view an image on the HMD 50 that is the same as the entire image displayed on the portable information processor 10 or that is a partial area of the entire image displayed on the portable information processor 10. In particular, the image display system 1 may have certain advantages. The size of the viewable area of the display device 20 in the portable information processor 10 may be restricted, which may enhance the portability of the portable information processor 10. For example, the viewable area of the display device 20 may be less than that of, for example, a non-portable personal computer. Therefore, depending on the image to be displayed, it may be difficult to comfortably view the content of the image, such as various kinds of information comprised in the image. According to the image display system 1, when communication is enabled between the portable information processor 10 and the HMD 50 (S100:YES of FIG. 4 and S300:YES of FIG. 6), a partial area of the entire image displayed on the portable information processor 10 may be selected (S112: Yes of FIG. 4), and a partial image comprising the partial area of the entire image may be viewed on the HMD 50 (S120 of FIG. 4 and S308 of FIG. 6). Therefore, the image display system 1 may improve visibility of the partial area of the entire image, which the user may desire to view.

In the description above, when manipulation of the manipulation device 24 of the portable information processor 10 is initiated (S200: Yes of FIG. 5), the manipulation status may be transmitted to the HMD 50 from the portable information processor 10 (S202 of FIG. 5). When the manipulation status is received in the HMD 50 and a positive determination is made at S400 of FIG. 7 (S400: Yes of FIG. 7), visibility of the displayed one of the entire image and the partial image by the image display device 68 may be reduced (S402 of FIG. 7).

The following configuration may also be used. The HMD 50 may be provided with an image pickup device (not depicted) that may pickup an image of the external world. An example of the image pickup device may be a charge-coupled device ("CCD") sensor. The image pickup device, such as a CCD sensor, may be attached to a predetermined position of the HMD 50 at which an image of the external world (e.g., the real world) in the line of sight of the user may be picked-up. For example, the image pickup device may be attached to an upper surface of the image display device 68. When the user wants to manipulate the manipulation device 24 of the portable information processor 10, the user may view the manipulation device 24. That is, when user manipulates manipulation device 24, image pickup device may capture manipulation status of the manipulation device 24. The CPU 56 of the HMD 50 may execute image analysis of the image data that represents the status of the picked-up image, instead of the determination at S400 of FIG. 7, and may determine whether the manipulation device 24 is being manipulated. When it is determined that the manipulation device 24 is being manipulated, the CPU 56 may execute S402 of FIG. 7 in the same manner described above. When the manipulation device 24 is not being manipulated and the determination result is negative, the CPU 56 may continue the image analysis until it is determined that the manipulation is started.

Alternatively, the CPU 56 may pickup the manipulation status of the manipulation device 24 that is being picked up by the image pickup device again after S402 is executed. The image pickup may be continuously executed. Instead of the determination at S404 of FIG. 7, the CPU 56 may execute image analysis of the image data that represents the picked-up manipulation status and determine whether the manipulation device 24 is being manipulated. When it is determined that the manipulation of the manipulation device 24 is not being manipulated because, for example, manipulation of the manipulation device 24 has already been completed, the CPU 56 may carry out S406 and S408 of FIG. 7 sequentially in the manner described above. When the manipulation device 24 is being manipulated, the CPU 56 may continue the image analysis until it is determined that the manipulation has been completed.

Such a configuration helps the user to view an image of the external world (e.g., the real world) via the half mirror 54. Therefore, the user may view and manipulate the manipulation device 24 of the portable information processor 10 comfortably. In an alternative configuration, the image data may function as manipulation information about the manipulation status of the manipulation device 24. In this alternative configuration, S200 to S206 of FIG. 5 may be excluded. In particular, the CPU 12 may determine the communication status between the portable information processor 10 and the HMD 50 (S208). When it is determined in the manipulation process depicted in FIG. 5 that communication between the portable information processor 10 and the HMD 50 is not enabled (S208: NO), the CPU 12 may clear the selected partial area (S210).

While the invention has been described in connection with various exemplary structures and illustrative embodiments, it will be understood by those skilled in the art that other variations and modifications of the structures, configurations, and embodiments described above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:
1. A system comprising:
   a portable information processor comprising:
     a first processor; and
     a first memory configured to store first computer-readable instructions therein,
     wherein the first computer-readable instructions instruct the first processor to execute processes comprising:

determining whether communication between a head-mountable display and the portable information processor is enabled;

receiving area information from the head-mountable display, the area information representing a range of the image data to be displayed on the head-mountable display;

setting an aspect ratio of a partial area according to the area information;

receiving a selection of at least a portion of image data being displayed by the portable information processor, a size of the selected at least a portion of the image data being limited by the aspect ratio of the partial area; and transmitting the selected at least a portion of the image data to the head-mountable display when the first processor determines that communication between the head-mountable display and the portable information processor is enabled; and the head-mountable display comprising:

a second processor; and a second memory configured to store second computer-readable instructions therein, wherein the second computer-readable instructions instruct the second processor to execute processes comprising:

transmitting the area information to the portable information processor;

receiving the selected at least a portion of the image data from the portable information processor; and displaying on the head-mountable display the selected at least a portion of the image data.

2. The system according to the claim 1, wherein the first computer-readable instructions further instruct the first processor to execute processes comprising:

displaying the selected at least a portion of the image data on the portable information processor when the first processor determines that communication between the head-mountable display and the portable information processor is not enabled.

3. The system according to claim 1, wherein the head-mountable display is configured to be a see-through type display configured to display image data;

wherein the first computer-readable instructions further instruct the first processor to execute processes comprising:

transmitting manipulation information to the head-mountable display, the manipulation information indicating whether the portable information processor is being manipulated; and wherein the second computer-readable instructions further instruct the second processor to execute processes comprising:

receiving the manipulation information from the portable information processor;

determining whether the portable information processor is being manipulated based on the manipulation information;

displaying on the head-mountable display the selected at least a portion of the image data in a first visibility state when the second processor determines that the portable information processor is not being manipulated based on the manipulation information; and displaying on the head-mountable display the selected at least a portion of the image data in a second visibility state when the second processor determines that the portable information processor is being manipulated based on the manipulation information, and wherein a visibility of the selected at least a portion of the image data is less in the second visibility state than in the first visibility state.

4. The system according to claim 3, wherein the head-mountable display comprises an adjustable visibility setting;

wherein the head-mountable display is configured to display the image data as a semi-transparent image when the adjustable visibility setting is set to the second visibility state; and wherein the head-mountable display is configured to display the image data as an opaque image when the adjustable visibility setting is set to the first visibility state.

5. The system according to claim 3, wherein the second computer-readable instructions further instruct the second processor to execute processes comprising:

changing the visibility of the selected at least a portion of the image data from the first visibility state to the second visibility state by reducing a brightness of the selected at least a portion of the image data displayed on the head-mountable display.

6. The system according to claim 3, wherein the second computer-readable instructions further instruct the second processor to execute processes comprising:

changing the visibility of the selected at least a portion of the image data from the first visibility state to the second visibility state by reducing a displayed size of the selected at least a portion of the image data displayed on the head-mountable display.

7. The system according to claim 3, wherein the second computer-readable instructions further instruct the second processor to execute processes comprising:

changing the visibility of the selected at least a portion of the image data from the first visibility state to the second visibility state by reducing a color density of the selected at least a portion of the image data displayed on the head-mountable display.

8. The system according to claim 1, wherein the head-mountable display is configured to be a see-through type display configured to display image data;

wherein the second computer-readable instructions further instruct the second processor to execute processes comprising:

acquiring manipulation information that indicates whether the portable information processor is being manipulated;

displaying on the head-mountable display the selected at least a portion of the image data in a first visibility state when determining that the portable information processor is not being manipulated based on the manipulation information; and displaying on the head-mountable display the selected at least a portion of the image data in a second visibility state when determining that the portable information processor is being manipulated based on the manipulation information, and wherein a visibility of the selected at least a portion of the image data is less in the second visibility state than in the first visibility state.

9. The system according to claim 8, wherein the head-mountable display comprises an adjustable visibility setting;

wherein the head-mountable display is configured to display the image data as an opaque image when the adjustable visibility setting is set to the first visibility state; and wherein the head-mountable display is configured to display the image data as a semi-transparent image when the adjustable visibility setting is set to the second visibility state.

10. A method of controlling a head-mountable display, the method comprising:

determining whether communication between a head-mountable display and a portable information processor is enabled;

receiving area information from the head-mountable display, the area information representing a range of image data to be displayed on the head-mountable display;

setting an aspect ratio of a partial area according to the area information;

receiving a selection of at least a portion of the image data being displayed by the portable information processor, and a size of the selected at least a portion of the image data being limited by the aspect ratio of the partial area;

displaying by the head-mountable display the selected at least a portion of the image data, the selected at least a portion of the image data having been transmitted from the portable information processor to the head-mountable display after determining that communication between the head-mountable display and the portable information processor is enabled.

11. A non-transitory, computer-readable storage medium storing computer readable instructions that, when executed, instruct a portable information processor to execute processes comprising:

determining whether communication between a head-mountable display and the portable information processor is enabled;

receiving area information from the head-mountable display, the area information representing a range of the image data to be displayed on the head-mountable display;

setting an aspect ratio of a partial area according to the area information;

receiving a selection of at least a portion of image data being displayed by the portable information processor, a size of the selected at least a portion of the image data being limited by the aspect ratio of the partial area; and transmitting the selected at least a portion of the image data to the head-mountable display when the portable information processor determines that communication between the head-mountable display and the portable information processor is enabled.

12. A system comprising:

a portable information processor comprising:

a first processor; and a first memory configured to store first computer-readable instructions therein, wherein the first computer-readable instructions instruct the first processor to execute processes comprising:

determining whether communication between a head-mountable display and the portable information processor is enabled;

identifying at least a portion of image data that is displayed by the portable information processor; and transmitting the identified at least a portion of the image data to the head-mountable display when the first processor determines that communication between the head-mountable display and the portable information processor is enabled; and the head-mountable display, which is configured to be a see-through type display configured to display the identified at least a portion of the image data, and which comprises:

a second processor; and a second memory configured to store second computer-readable instructions therein, wherein the second computer-readable instructions instruct the second processor to execute processes comprising:

receiving the identified at least a portion of the image data from the portable information processor;

acquiring manipulation information that indicates whether the portable information processor is being manipulated;

changing a visibility of the identified at least a portion of the image data displayed in the head-mountable display from a first visibility state to a second visibility state when acquiring the manipulation information indicating that the portable information processor is being manipulated; and changing the visibility of the identified at least a portion of the image data displayed in the head-mountable display from the second visibility state to the first visibility state when acquiring the manipulation information indicating that the portable information processor is not being manipulated based on the manipulation information, wherein a visibility of the identified at least a portion of the image data is less in the second visibility state than in the first visibility state.

13. The method according to claim 10, further comprises:

determining whether the portable information processor is being manipulated based on manipulation information having been transmitted from the portable information processor to the head-mountable display, the manipulation information indicating whether the portable information processor is being manipulated, and the head-mountable display being a see-through type display configured to display image data;

displaying on the head-mountable display the selected at least a portion of the image data in a first visibility state when determining that the portable information processor is not being manipulated based on the manipulation information; and displaying on the head-mountable display the selected at least a portion of the image data in a second visibility state when determining that the portable information processor is being manipulated based on the manipulation information, and wherein a visibility of the selected at least a portion of the image data is less in the second visibility state than in the first visibility state.

14. The method according to claim 13, further comprises:

displaying the selected at least a portion of the image data on the portable information processor when the determining that communication between the head-mountable display and the portable information processor is not enabled.

15. The non-transitory, computer-readable storage medium according to claim 11, wherein the computer readable instructions further instruct the portable information processor to execute processes comprising:

displaying the selected at least a portion of the image data on the portable information processor when the portable information processor determines that communication between the head-mountable display and the portable information processor is not enabled.

16. The system according to the claim 12, wherein the first computer-readable instructions further instruct the first processor to execute processes comprising:

displaying the selected at least a portion of the image data on the portable information processor when the first processor determines that communication between the head-mountable display and the portable information processor is not enabled.

17. The system according to the claim 12, wherein the second computer-readable instructions further instruct the second processor to execute processes comprising:

transmitting area information representing a range of the image data, the range of the image data is to be displayed on the head-mountable display; and wherein the first computer-readable instructions further instruct the first processor to execute processes comprising:

identifying the at least a portion of the image data that is displayed by the portable information processor based on the received area information.

18. The system according to claim 12, wherein the head-mountable display comprises an adjustable visibility setting;

wherein the head-mountable display is configured to display the image data as an opaque image when the adjustable visibility setting is set to the first visibility state; and wherein the head-mountable display is configured to display the image data as a semi-transparent image when the adjustable visibility setting is set to the second visibility state.

19. A head-mountable display comprising:
a processor; and
a memory configured to store computer-readable instructions that, when executed, instruct the processor to execute processes comprising:

transmitting area information to a portable information processor, the area information limiting a selection range for selecting image data to be displayed on the head-mountable display, the image data being displayed by the portable information processor;

receiving at least a portion of the image data from the portable information processor in response to the transmission of the area information; and displaying on the head-mountable display the received at least a portion of the image data.

20. The head-mountable display according to claim 19, wherein the head-mountable display is configured to be a see-through type display configured to display image data, and wherein the computer-readable instructions further instruct the processor to execute processes comprising:

acquiring manipulation information that indicates whether the portable information processor is being manipulated;

displaying on the head-mountable display the selected at least a portion of the image data in a first visibility state when determining that the portable information processor is not being manipulated based on the manipulation information; and displaying on the head-mountable display the selected at least a portion of the image data in a second visibility state when determining that the portable information processor is being manipulated based on the manipulation information, and wherein a visibility of the selected at least a portion of the image data is less in the second visibility state than in the first visibility state.

* * * * *